Nov. 4, 1952  H. O. REINWAND  2,616,339
BRAKE LINING REMOVING MACHINE
Filed May 14, 1951  2 SHEETS—SHEET 1
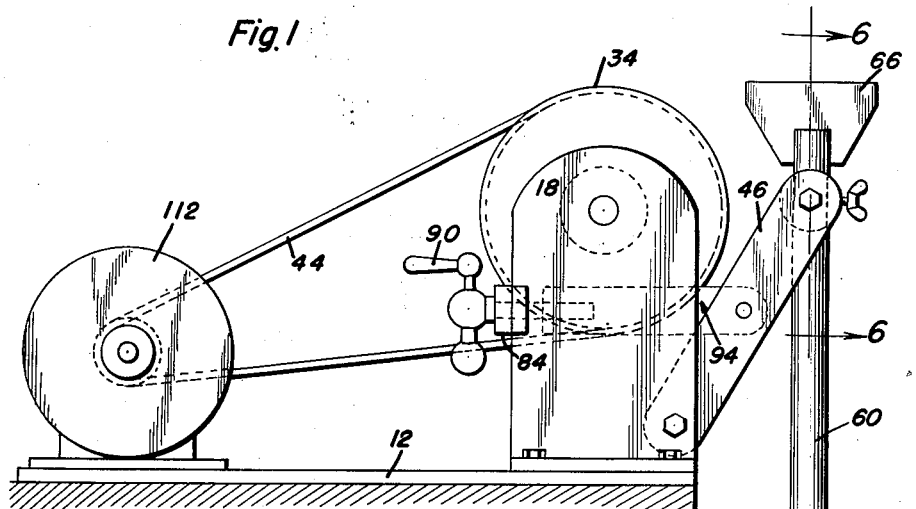
Fig. 1
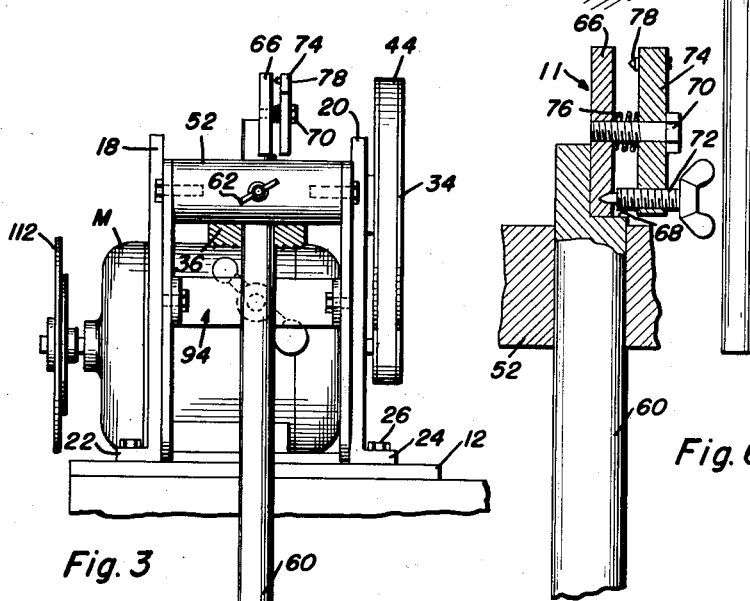
Fig. 3
Fig. 6
Harold O. Reinwand
INVENTOR.
BY *Clarence A. O'Brien*
*and Harvey B. Jacobson*
Attorneys Nov. 4, 1952 H. O. REINWAND 2,616,339
BRAKE LINING REMOVING MACHINE
Filed May 14, 1951 2 SHEETS—SHEET 2
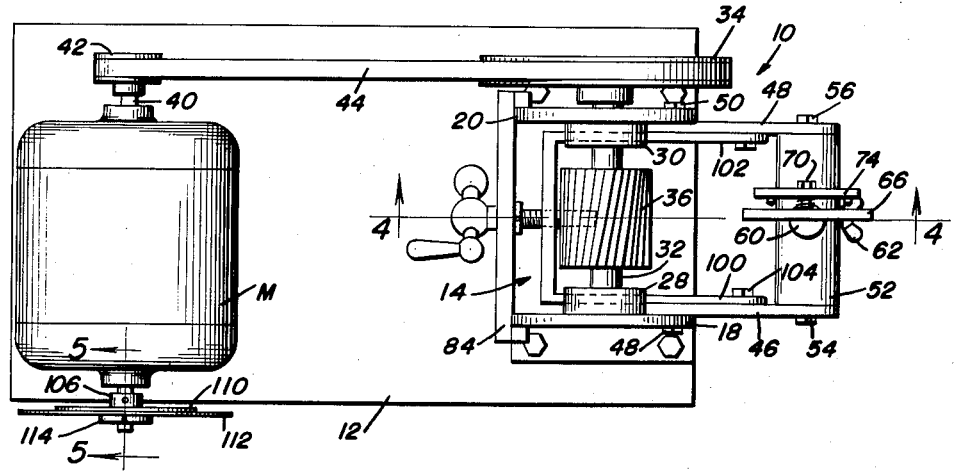
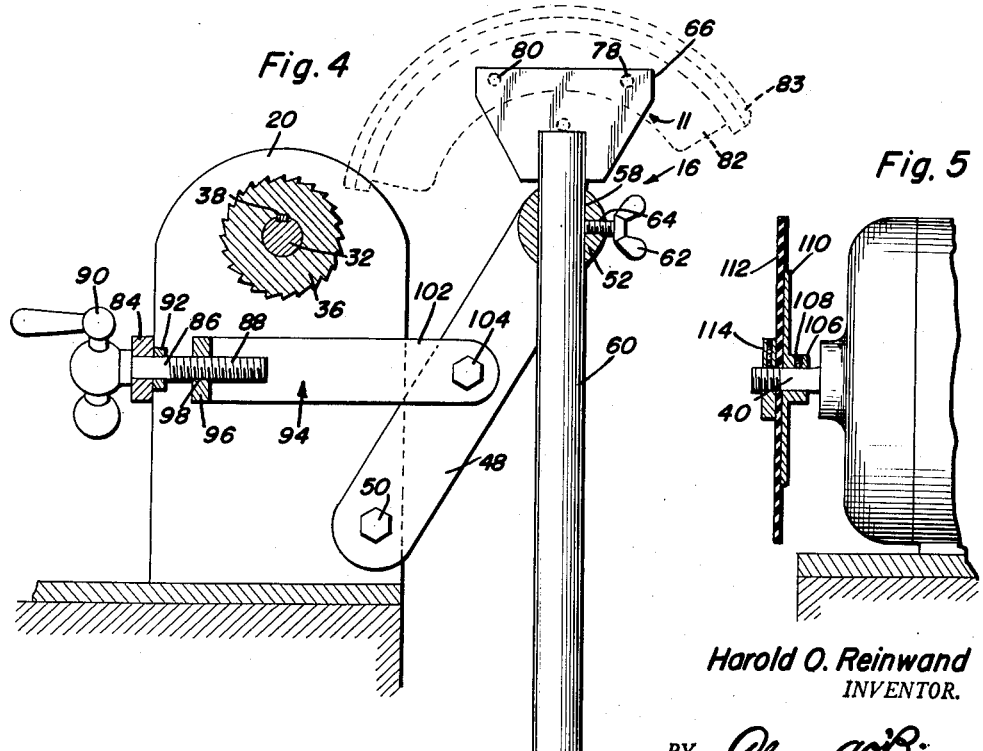
Harold O. Reinwand
INVENTOR.

Patented Nov. 4, 1952　　　　　　　　　　　　　　　　　　　　　　　　　　2,616,339

UNITED STATES PATENT OFFICE 2,616,339

BRAKE LINING REMOVING MACHINE

Harold O. Reinwand, Lawton, Okla.

Application May 14, 1951, Serial No. 226,169

5 Claims. (Cl. 90—20)

The present invention relates to a milling machine, and more particularly to a machine which is provided with means whereby brake linings can be removed from brakeshoes to which the linings have become bonded.

An object of the present invention is to provide a machine for removing brake linings bonded to brakeshoes, the machine embodying means for rotatably supporting the milling cutter and means for effecting rotation of the milling cutter, other means being provided for rotatably supporting the brakeshoe in fixed relation to the milling cutter, whereby the brakeshoe can be pivoted in order that the brake lining bonded thereto can be removed therefrom by means of a cutter.

A further object of the present invention resides in the manner in which the brakeshoe is carried by an arm rotatably supported relative to the milling cutter.

Still another object of the present invention resides in the provision of means for adjustably positioning the pivotably supported arm carrying the brakeshoe whereby the machine can be employed for various sized shoes.

A further object of the present invention resides in the provision of a buffing disk which is connected to the prime mover for the milling cutter whereby the same can be rotated, the buffing disk being provided for completing the operation of removing the brake lining bonded to the brakeshoe.

Various other objects and advantages will become apparent from the detailed description to follow. The best form in which I have contemplated applying my invention is clearly illustrated in the accompanying drawings, wherein:

Figure 1 is a side elevational view of the brake lining removing machine of the present invention;

Figure 2 is a top plan view of the machine of Figure 1;

Figure 3 is an end elevational view of the machine of Figure 1;

Figure 4 is a vertical longitudinal sectional view taken substantially along the plane of line 4—4 of Figure 2;

Figure 5 is a detail sectional view taken substantially along the plane of line 5—5 of Figure 2; and Figure 6 is a detail vertical transverse sectional view taken substantially along the plane of line 6—6 of Figure 1.

Referring more particularly to the drawings, wherein like numerals designate like parts throughout, the numeral 10 designates generally the entire mechanism which constitutes the present invention. The machine 10 is comprised of a prime mover in the form of an electric motor M fixedly disposed on the stand 12, the numeral 14 designates generally the milling means of the present invention, while the numeral 16 designates generally the brakeshoe supporting means.

The stand 12 is formed from a substantially rectangular and elongated plate. The electric motor M is fixedly secured to the plate 12 at one end. At the opposing end of the plate 12, a pair of upstanding plates 18 and 20 have their lower angulated ends 22 and 24 fixedly secured to the plate 12 by means of the bolts 26. The plates 18 and 20 are in spaced parallel relation and have a pair of ball bearing units 28 and 30 secured to their opposing faces and in axial alignment with each other. The plates 18 and 20 have axially aligned openings coaxial with the bearings 28 and 30, a milling cutter shaft 32 being rotatably carried by the bearings 28 and 30 with one end thereof extending through the plate 20 and having a pulley sheave 34 fixedly secured thereto. The shaft 32 has a milling cutter 36 fixedly secured thereto between the bearings 28 and 30 for a purpose to be hereinafter more fully described. The milling cutter 36 is shown keyed to the shaft 32 by means of the keys 38, whereby the milling cutter can be removed for replacement or sharpening.

Electric motor M has its armature shaft 40 extending from both ends, one of the ends of the shaft 40 having a pulley sheave 42 secured thereto. A pulley belt 44 is disposed over the pair of pulley sheaves 34 and 42 for drivingly interconnecting the motor M with the milling cutter 36.

Looking now at Figures 4 and 6, the structure of the shoe-holding means 16 will presently be described. A pair of arms 46 and 48 (see Figure 2) are pivotably carried by the upstanding plates 18 and 20 by means of the bolts 49 and 50. The upper free ends of the arms 46 and 48 have a shaft 52 rotatably carried thereby, a pair of lugs 54 and 56 extending through the free ends of the arms 46 and 48 for engagement with opposite ends of the shaft 52.

The shaft 52 is formed with a bore 58 at the center thereof, a handle 60 being slidably disposed through the bore 58 and having shoe clamping means 11 carried by its upper end. The handle 60 is vertically adjustable relative to the shaft 52 by means of the set screw 62 which is transversely engaged thru a threaded bore 64 in the shaft 52 for engagement with the handle 60.

The clamping means 11 for the brakeshoes is comprised of a first carrier plate 66 which is fixedly secured to the upper end of the handle 60 within the recess 68. The first plate 66 has a lug 70 fixedly secured thereto and at the center thereof. An adjusting screw 72 is rotatably carried by the first plate 66 and is engaged through a second carrier plate 74 which is slidably carried by the lug 70. A coil compression spring 76 encircles the lug 70 for urging the first and second carrier plates apart. The second carrier plate is provided with a pair of spaced dowel pins 78 and 80. Dowel pins 78 and 80 have pointed ends whereby, when the set screw 72 is rotated, the second carrier plate 74 is urged in opposition to the spring 76 with the dowel pins 78 and 80 clampingly engaging the annular portion 82 of the brakeshoe.

Looking now at Figures 2 through 4, it will be seen that the pair of plates 18 and 20 have an elongated bracket of substantially U-shape secured thereto, the bracket being designated by the numeral 84. A shank 86 having a threaded portion 88 is rotatably carried by the bracket 84 and has a handle 90 secured thereto. The shank 86 has a ring 92 secured thereto whereby the shank will be held from displacement relative to the bracket 84.

A U-shaped member 94 has its bight portion 96 formed with a threaded bore 98 threadably receiving the threaded portion 88 of the shank 86. The free ends of the arms 100 and 102 are pivotally connected to the arms 46 and 48 by means of the bolts 104. It will therefore readily be seen that by rotation of the handle 90, the positioning of the shaft 52 and handle 60 carried thereby can be adjusted relative to the milling cutter 36, depending upon the size of the brakeshoe to be repaired.

Looking now at Figures 2 and 5, it will be seen that the armature shaft 40 of the motor M has a ring 106 secured thereto by means of the set screw 108. A backing plate 110 is carried by the shaft 40 and has a rubber-like buffing disk 112 disposed in abutment thereto. A retaining disk 114 is engaged on the shaft 40 for retaining the buffing disk 112 against the backing plate 110 and ring 106.

In view of the foregoing description of the structure of the present invention, it is believed that one skilled in the art will readily understand the manner in which the machine can be employed for removing linings bonded to brakeshoes.

The brakeshoe 82 having the lining 83 bonded thereto is disposed with the annular portion of the brakeshoe between the first and second carrier plates 66 and 74. The screw 72 is adjusted so that the dowel pin 78 engages the annular portion of the brakeshoe and clampingly supports the same. The handle 60 is then relatively adjustably secured to the shaft 52 and the positioning of the shaft 52 relative to the milling cutter 36 is adjusted by means of the handle 90. Electric motor M is actuated and the handle 60 is pivoted so that the brake lining 83 will come in contact with the milling cutter 36 whereby the brake lining will be removed from the brakeshoe.

In order to remove any of the remaining brake lining on the brakeshoe, the brakeshoe can be pressed against the buffing disk for removal of the remaining lining.

The brakeshoe, after the removal of the bonded lining, can be reassembled onto a vehicle for further use.

Having described the invention, what is claimed as new is:

1. A device for removing brake linings bonded to brakeshoes, said device comprising a stand having a prime mover mounted thereon, a pair of upstanding plates carried by said stand and rotatably supporting a milling cutter therebetween, each of said upstanding plates having an arm supported in inclined relation thereto, the free ends of said arms being joined by a rotatable shaft, a handle adjustably carried by said shaft for rotation therewith, and means on said handle for removably securing a brakeshoe thereto whereby pivoting of said handle carries the brakeshoe into juxtaposition to said milling cutter for cutting the brake lining therefrom, said milling cutter being connected to the prime mover for rotation thereby, a U-shaped member pivotally connected to said pair of arms, and an adjusting means rotatably carried by said upstanding plates and engageable with the bight portion of said U-shaped member for effecting adjustment of the angular inclination of said arms.

2. A device for removing brake linings bonded to brakeshoes, said device comprising a stand having a prime mover mounted thereon, a pair of upstanding plates carried by said stand and rotatably supporting a milling cutter therebetween, each of said upstanding plates having an arm supported in inclined relation thereto, the free ends of said arms being joined by a rotatable shaft, a handle adjustably carried by said shaft for rotation therewith, and means on said handle for removably securing a brakeshoe thereto whereby pivoting of said handle carries the brakeshoe into juxtaposition to said milling cutter for cutting the brake lining therefrom, said milling cutter being connected to the prime mover for rotation thereby, said means including a first carrier plate fixedly secured to said handle, a lug secured to the central portion of said carrier plate, a second carrier plate slidably carried by said lug and maintained in parallel relation thereto, and means for positively adjustably positioning said second carrier plate relative to said first carrier plate.

3. A device for removing brake linings bonded to brakeshoes, said device comprising a stand having a prime mover mounted thereon, a pair of upstanding plates carried by said stand and rotatably supporting a milling cutter therebetween, each of said upstanding plates having an arm supported in inclined relation thereto, the free ends of said arms being joined by a rotatable shaft, a handle adjustably carried by said shaft for rotation therewith, and means on said handle for removably securing a brakeshoe thereto whereby pivoting of said handle carries the brakeshoe into juxtaposition to said milling cutter for cutting the brake lining therefrom, said milling cutter being connected to the prime mover for rotation thereby, said means including a first carrier plate fixedly secured to said handle, a lug secured to the central portion of said carrier plate, a second carrier plate slidably carried by said lug and maintained in parallel relation thereto, and means for positively adjustably positioning said second carrier plate relative to said first carrier plate, said second carrier plate having a pair of dowel pins carried thereby for engagement with the brakeshoe for holding the same from angular displacement relative to said handle.

4. A device for removing brake linings bonded to brakeshoes, said device comprising a stand having a prime mover mounted thereon, a pair of upstanding plates carried by said stand and rotatably supporting a milling cutter therebetween, each of said upstanding plates having an arm supported in inclined relation thereto, the free ends of said arms being joined by a rotatable shaft, a handle adjustably carried by said shaft for rotation therewith, and means on said handle for removably securing a brakeshoe thereto whereby pivoting of said handle carries the brakeshoe into juxtaposition to said milling cutter for cutting the brake lining therefrom, said milling cutter being connected to the prime mover for rotation thereby, a U-shaped member pivotally connected to said pair of arms, and an adjusting means rotatably carried by said upstanding plates and engageable with the bight portion of said U-shaped member for effecting adjustment of the angular inclination of said arms, said means including a first carrier plate fixedly secured to said handle, a lug secured to the central portion of said carrier plate, a second carrier plate slidably carried by said lug and maintained in parallel relation thereto, and means for positively adjustably positioning said second carrier plate relative to said first carrier plate.

5. A device for removing brake linings bonded to brakeshoes, said device comprising a stand having a prime mover mounted thereon, a pair of upstanding plates carried by said stand and rotatably supporting a milling cutter therebetween, each of said upstanding plates having an arm supported in inclined relation thereto, the free ends of said arms being joined by a rotatable shaft, a handle adjustably carried by said shaft for rotation therewith, and means on said handle for removably securing a brakeshoe thereto whereby pivoting of said handle carries the brakeshoe into juxtaposition to said milling cutter for cutting the brake lining therefrom, said milling cutter being connected to the prime mover for rotation thereby, said shaft having a bore therethrough for slidably receiving said handle and a set screw transversely extending through said shaft for engagement with said handle.

HAROLD O. REINWAND.

REFERENCES CITED

The following references are of record in the file of this patent:

UNITED STATES PATENTS

| Number | Name | Date |
|---|---|---|
| 1,827,763 | Richardson | Oct. 20, 1931 |
| 2,585,973 | Stieglitz | Feb. 19, 1952 |